US007181567B2

(12) United States Patent
Krishnan

(10) Patent No.: US 7,181,567 B2
(45) Date of Patent: Feb. 20, 2007

(54) HITLESS RESTART OF ACCESS CONTROL MODULE

(75) Inventor: Ram Krishnan, Santa Clara, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 251 days.

(21) Appl. No.: 10/454,103

(22) Filed: Jun. 4, 2003

(65) Prior Publication Data
US 2003/0225965 A1 Dec. 4, 2003

Related U.S. Application Data

(60) Provisional application No. 60/385,976, filed on Jun. 4, 2002.

(51) Int. Cl.
*G06F 12/00* (2006.01)
(52) U.S. Cl. ............... 711/108; 365/49; 365/50; 711/205; 711/207
(58) Field of Classification Search ................ 711/108, 711/205–207; 365/49–50
See application file for complete search history.

(56) References Cited

U.S. PATENT DOCUMENTS

| 5,295,137 A * | 3/1994 | Jurkevich ............ 370/389 |
| 5,485,576 A | 1/1996 | Fee et al. |
| 5,754,804 A | 5/1998 | Cheselka et al. |
| 5,920,886 A * | 7/1999 | Feldmeier ............ 711/108 |
| 5,953,314 A | 9/1999 | Ganmukhi et al. |
| 6,091,731 A | 7/2000 | Biegaj et al. |
| 2001/0043614 A1 * | 11/2001 | Viswanadham et al. .... 370/469 |
| 2002/0126547 A1 * | 9/2002 | Kato et al. ............ 365/200 |
| 2002/0191628 A1 * | 12/2002 | Liu et al. ............ 370/428 |

FOREIGN PATENT DOCUMENTS

WO    WO03052765 A1 *  6/2003

OTHER PUBLICATIONS

"High Availability for the Catalyst 6000 Family," Cisco Systems, White Paper, Copyright 2001.

* cited by examiner

*Primary Examiner*—Pierre Bataille
*Assistant Examiner*—Hetul Patel

(57) ABSTRACT

Performing selective update of a content addressable memory (CAM) following restart of an access control module (ACM) at a network node involves maintaining a restart CAM entry database in shared memory. When the ACM restarts, instead of reentering all CAM entries into the CAM or reading the contents of the CAM, the ACM only updates the CAM with the entries that were modified while the ACM was offline, prior to restart.

13 Claims, 5 Drawing Sheets

400A

| Access List Name 402 | Interface Index 404 | Input/Output Flag 406 |

| Access List Name 412 | Access List Entry Parameters 414 | Interface Index 416 | Flags 418 | Real CAM Address 420 |

Access List Name

| | |
|---|---|
| A | Access List Entry Parameters — 430-0 |
| | — 430-1 |
| B | Access List Entry Parameters — 430-2 |
| B | Access List Entry Parameters — 430-3 |
| C | Access List Entry Parameters — 430-4 |
| B | Access List Entry Parameters — 430-5 |
| A | Access List Entry Parameters — 430-6 |
| | — 430-7 |

HITLESS RESTART OF ACCESS CONTROL MODULE

CROSS REFERENCE TO RELATED APPLICATION

This application is entitled to the benefit of provisional Patent Application Ser. No. 60/385,976, filed 4 Jun. 2002. This application incorporates by reference co-pending patent application Ser. No. 10/321,871 filed 17 Dec. 2002 entitled "MANAGING A POSITION-DEPENDENT DATA SET THAT IS STORED IN A CONTENT ADDRESSABLE MEMORY ARRAY AT A NETWORK NODE."

FIELD OF THE INVENTION

The invention relates to performing lookups at network nodes, and more particularly to restarting an access control module (ACM) with an associated content addressable memory (CAM).

BACKGROUND OF THE INVENTION

A lookup is a data search performed within a predefined table of values. Lookups are performed frequently in the process of handling network traffic. For example, an access control module (ACM) may perform lookups in relation to an access list (AL), which is sometimes referred to as an access control list (ACL). In a lookup, information from incoming packets, such as header information, is used to compare against information stored in a lookup table to determine how the packet should be handled. In the process of handling network traffic, a lookup may entail using information from one or more protocol layers, where the layers are defined by the International Standards Organization (ISO) in the Open System Interconnection (OSI) model.

Lookup tables can be implemented in network nodes using memory such as content addressable memory (CAM), pseudo-CAM (e.g., static random access memory (SRAM) that, together with a finite state machine, emulates operation of CAM), embedded microengines that provide programmable lookups under software control, or a combination of methods. In order to implement larger lookup tables, more memory is needed. Moreover, the lookup tables are constantly updated in operation. Accordingly, a control module must frequently add new entries to the lookup tables and remove old entries. Since writing to memory consumes memory resources, updating lookup tables can be relatively costly in terms of processing resources. Nevertheless, frequent updates are often required to provide network efficiency and reliability.

To further improve reliability in network systems, "hitless" restart mechanisms have been developed. The term "hitless" is used in the field to describe a system that does not drop any packets during a system interruption (e.g., hardware failure, software failure, software update, system restart, etc.). When routing software associated with a network device goes offline due to hardware failures, intentional updating of the software, or other reasons, hitless restart mechanisms ensure that the network device is offline for a minimum amount of time in order to prevent any packets from being dropped. However, when the routing software restarts, the network device must repopulate tables that are used by the routing software. It is generally believed that the memory resource cost associated with repopulating the tables is well worth the improved reliability gained from hitless restart mechanisms. However, when repopulating the tables, systems typically read from hardware tables to determine the contents. This is a resource intensive operation. Accordingly, it would be advantageous if memory resource costs could be reduced, particularly the reading from hardware tables.

Because writing to memory should be avoided where possible, what is needed is an efficient technique for preventing the rewrite of an entire lookup table even after the lookup table fails to receive lookup table updates for a period of time.

SUMMARY OF THE INVENTION

A technique for hitless restart of an access control module (ACM) includes maintaining a main central processing unit (CPU) access control module (MACM) and a plurality of linecard access control modules (LACMs), preserving a lookup table associated with a LACM when the LACM goes offline, and, when the LACM comes back online, updating the LACM with only changes made in the MACM while the LACM was offline. The lookup table is preserved by storing information associated with the lookup table, including entries and lookup table locations for the entries, in persistent memory.

The technique described above preserves existing CAM entries and updates a CAM with only those changes that have been made at a MACM since a LACM went offline without requiring reading the entries from the CAM.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIGS. 4A, 4B, and 4C respectively depict an exemplary applied access list entry, an exemplary CAM entry database record, and an exemplary lookup table in accordance with an embodiment of the invention.

DETAILED DESCRIPTION OF THE INVENTION

Figure 1:
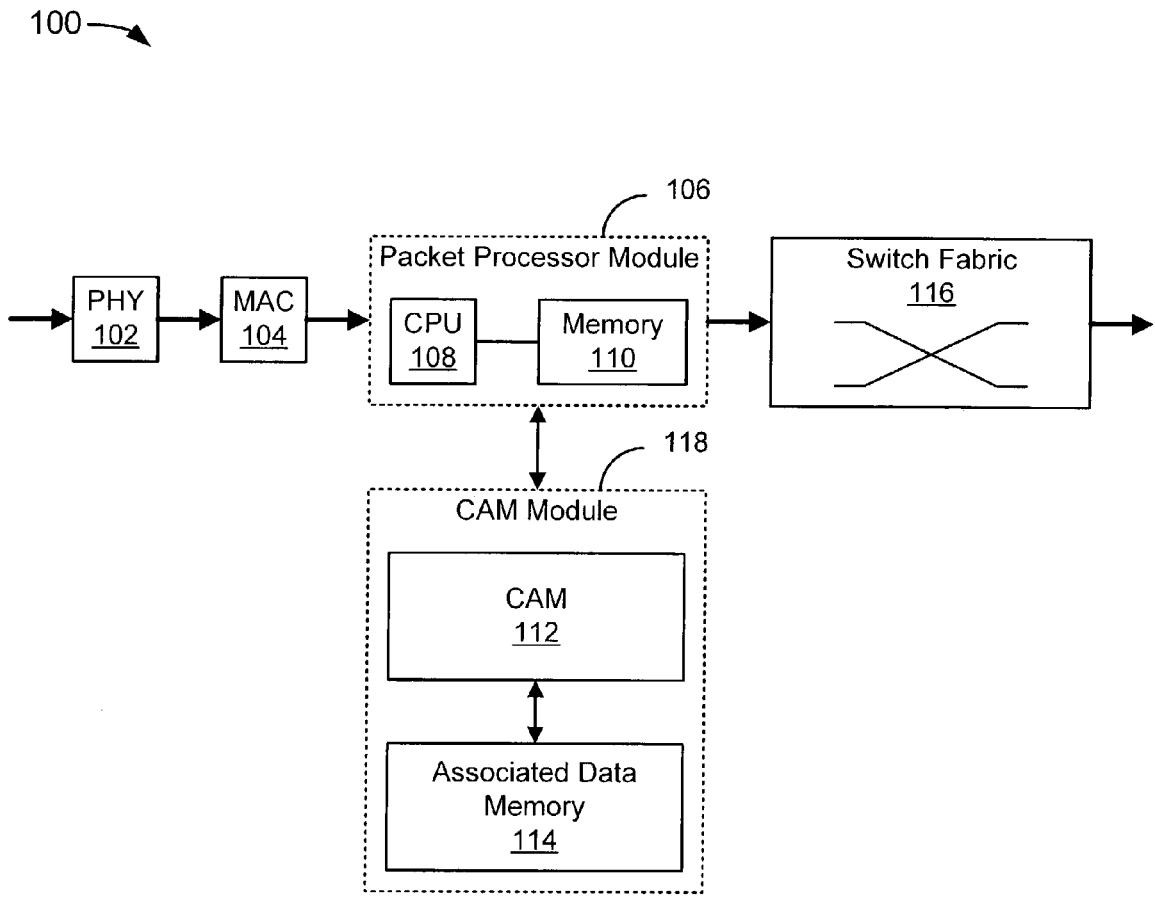
FIG. 1 depicts relevant functional blocks of a network node that utilizes a CAM module for route lookups.

FIG. 1 depicts relevant functional blocks of a network node 100, such as a switch or a router, that forwards packets within a network. The network node 100 includes a PHY 102, a MAC 104, a packet processor 106, a CAM module 118, and a switch fabric 116. In an embodiment, the network node is an Ethernet-based switch/router.

The PHY 102 is the physical interface between the incoming signals and the network node. In an embodiment that includes an optical connection, the PHY converts incoming light pulses into electrical signals and then identifies the incoming data segments, for example, incoming Ethernet frames. The PHY forwards the incoming data segments to the MAC 104. The PHY is a well-known functional unit in switches and routers and is not described in further detail.

The MAC 104 manages the layer 2 addressing control for the network nodes. For bridged data segments (i.e., Ethernet frames), the MAC reads the layer 2 header of incoming data segments and may perform layer 2 lookups to determine how to forward the incoming data segments to their next destination within the network node. For routed data segments (i.e., IP packets), the MAC forwards the data segments to the packet processor module 106.

The packet processor module 106 performs layer 3 address lookups for routed data segments (i.e., IP packets). In an embodiment, the packet processor may also perform layer 2 forwarding functions. As shown in FIG. 1, the packet processor module is in communication with the CAM module 118. The packet processor module includes a CPU 108 and memory 110.

The CPU 108 is a multifunction processor that performs various management functions. In an embodiment, the PHY 102, MAC 104, packet processor module 106, CPU 108, and memory 110 are located on the same line card and the CPU handles control functions on the line card. The CPU implements software instructions. Software instructions that are implemented by the CPU may be stored in the memory. In an embodiment, the memory is dynamic random access memory (DRAM) that is accessible to the CPU. As is described below, the CPU provides instructions for updating the CAM module 118 in a manner that maintains the priority order of CAM entries.

The CAM module 118 includes a CAM 112 and associated data memory 114. In an embodiment, the associated data memory is implemented in static random access memory (SRAM). In another embodiment, the CAM module is located off chip. The CAM includes a lookup table. The lookup table includes entries that are used to determine a next hop for routed packets. More specifically, the lookup table includes entries such as access control, policy, and quality of service (QoS) entries. Since policy and QoS use ALs as a profile, they are managed in a similar manner. Each AL is an ordered linked list of entries that specify one or more packet parameters, such as source internet protocol (IP) addresses, destination IP addresses, TCP/UDP source ports, and TCP/UDP destination ports. The associated data memory includes information associated with the entries of the lookup tables that is used to forward packets, such as exit port mapping and exit destination MAC addresses. In the case of multicast packets, route information includes multiple exit ports and multiple exit destination MAC addresses. In an embodiment, the lookup table is part of an access control logic (ACL) that includes the function of permitting or denying entry of a packet into the switch fabric 116. Lookup tables are well-known functional units in switches and routers and are not discussed in further detail.

The switch fabric 116 creates a datapath between an input packet processor and an output packet processor. Switch fabrics that are utilized with Ethernet switch/routers are known in the field and may include shared memory, shared bus, and cross point matrices.

Figure 2A:
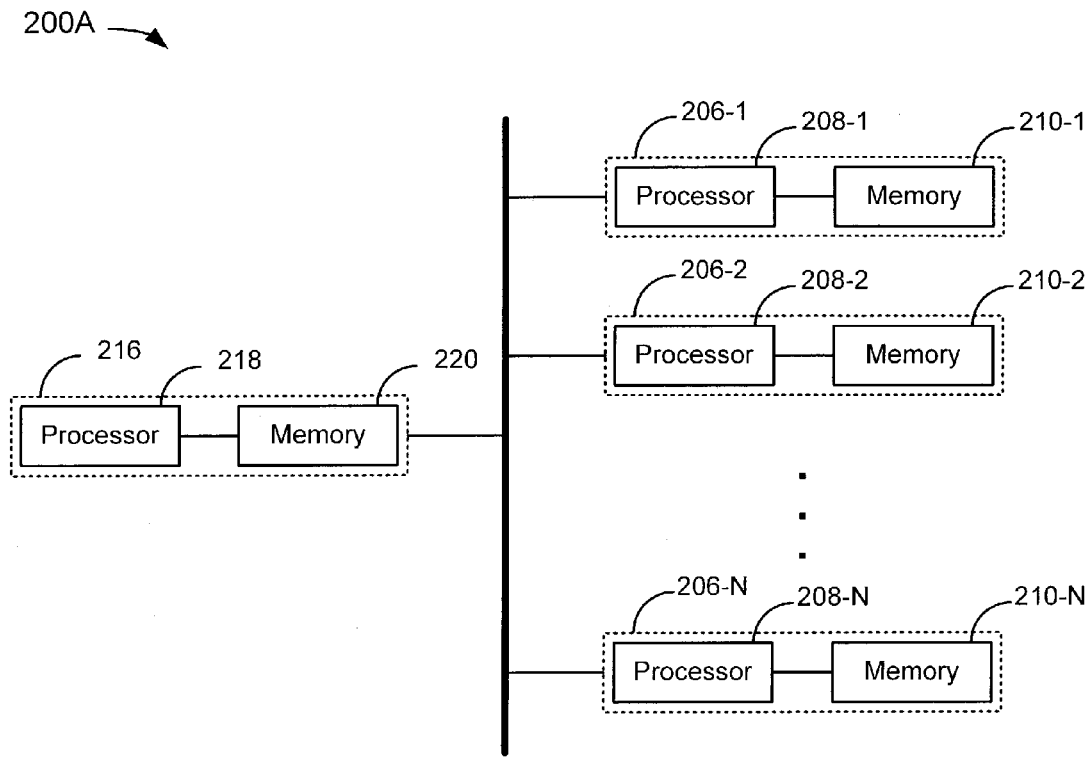
FIGS. 2A–2B depict a system that incorporates the network node of FIG. 1 in accordance with an embodiment of the invention.

FIG. 2A depicts a system 200A that incorporates the network node of FIG. 1. The system 200A has a distributed architecture that includes a control module 216 and one or more linecard modules 206-1 to 206-N, referred to collectively as linecard modules 206. The control module includes a processor 218 and memory 220. The linecard modules respectively include processors 208-1 to 208-N, collectively referred to as processors 208, and memories 210-1 to 210-N, collectively referred to as memories 210.

Figure 2B:
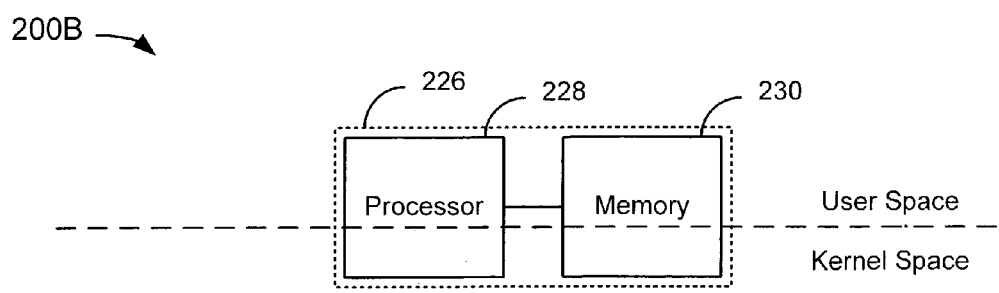

FIG. 2B depicts a subsystem 200B that includes a module 226. FIG. 2B is a functional depiction that is intended to illustrate how the operating system (OS) of the module is logically divided into a "user space" and a "kernel space." The module includes a processor 228 and memory 230. The module may be, for example, a control module, such as the control module 216 (FIG. 2A), or a linecard module, such as the linecard modules 206 (FIG. 2A). As a rule, kernel space resources are better protected than user space resources. Accordingly, when the module is restarted, data stored in the user space may be lost, whereas data stored in the kernel may not.

Description of an OS in terms of a kernel space and a user space is well known in the field of computer science. The kernel space of an OS is a part of the OS that manages hardware resources, provides fundamental functionality, and provides fundamental programming interfaces to applications that operate in the user space. Example switch/router operations performed in the kernel space include exception packet processing, maintaining statistics, and managing hardware tables that include L2 tables, L3 tables, access control lists (ACLs), quality of service (QoS) tables, and exit port tables.

The user space of an OS, also referred to as the "userland," is the part of the OS that includes the applications that are supported by the kernel. The applications perform specific tasks such as network management, configuration management, and L2 and L3 protocol processing. Multiple applications may be running simultaneously in the user space. All of the running applications are supported by, and rely on, the processing resources of the kernel to execute the application calls. Because multiple applications may be running simultaneously in the user space, the applications compete for processing resources in the kernel space.

Figure 3:
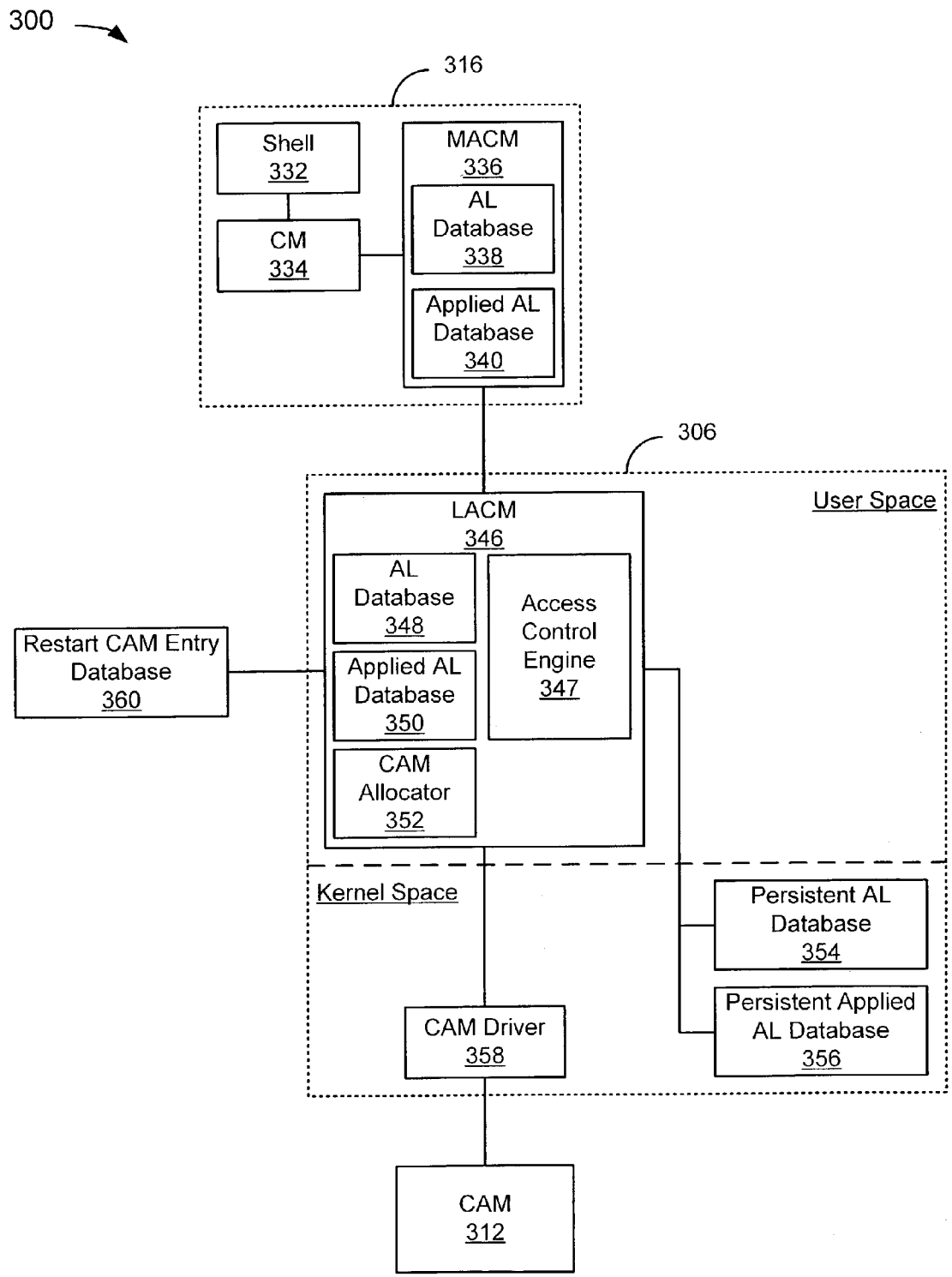
FIG. 3 depicts an exemplary embodiment of an access control module subsystem for use with the system of FIG. 2A.

FIG. 3 depicts an exemplary embodiment of an access (ACM) subsystem 300 for use with the system of FIG. 2A. The ACM subsystem includes a control module 316, a lookup module 306, a restart CAM entry database 360, and a CAM 312.

The control module 316 includes a shell 332, configuration manager (CM) 334, and a main access control module (MACM) 336. The MACM includes an AL database 338 and an applied AL database 340. In an embodiment, the AL database includes one or more linked lists. Each linked list is an AL. In another embodiment, the applied AL database includes one or more entries that include a name associated with an AL and an interface onto which the AL is mapped. In another embodiment, the AL database and applied AL database are stored in memory in the user space of the control module. In an embodiment, the AL database includes policy and QoS entries. Typically, a user, which may be a human, a software agent, or some other agent, enters ALs using the shell. The shell is a well-understood functional unit in the art of switches and routers and is not discussed in further detail. The CM receives the ALs input from the shell and configures the ALs for entry into the AL database stored in the MACM. Similarly, the CM receives applied AL input from the shell and configures the input for entry into the applied AL database. An exemplary applied AL entry 400A is depicted in FIG. 4A. As shown, the applied AL input includes an AL name 402, interface to which the AL associated with the AL name maps 404, and an input/output flag 406. The MACM then communicates the contents of the AL database and the applied AL database to the lookup module 306. The mapping, or application, of an AL to an interface is well-known in the art of traffic forwarding and is, therefore, not discussed in further detail.

In an embodiment, the lookup module 306 is a component of a linecard. The lookup module 306 includes a linecard access control module (LACM) 346, a persistent AL database 354, a persistent applied AL database 356, and a low-level CAM driver 358. The LACM includes an access control engine 347, an AL database 348, an applied AL database 350, and a CAM allocator 352. In an embodiment, the access control engine 347 is a combination of processor resources and memory. The access control engine performs routines used at the LACM. Accordingly, when the LACM performs an action, such as updating a database, it typically makes use of the access control engine.

The AL database 348 from the LACM is configured to match the AL database 338 from the MACM and the applied AL database 350 from the LACM is configured to match the applied AL database 340 from the MACM. Of course, there may be a time lag (probably short) between when the CM 334 updates the MACM 336 and when the MACM updates the LACM 346. Accordingly, at a given time, the AL database 348 at the LACM and the AL database 338 at the MACM may be different. Similarly, at a given time, the applied AL database 350 at the LACM and the applied AL database 340 at the MACM may be different. The persistent AL database 354 at the LACM is a copy of the AL database 348 at the LACM. Similarly, the persistent applied AL database 356 at the LACM is a copy of the applied AL database 350 LACM. In an embodiment, the persistent AL database and the persistent applied AL database are located in the kernel of the linecard module. The LACM updates the persistent AL database when the ALs change and the persistent applied AL database when the interfaces to which the ALs are applied change. In an embodiment, the LACM updates the AL database and persistent AL database simultaneously. Similarly, in an embodiment, the LACM updates the applied AL database and persistent applied AL database simultaneously. In an alternative, there is a time lag between when the LACM updates the AL database and the persistent AL database and when the LACM updates the applied AL database and the persistent applied AL database.

One reason to keep the persistent AL database 354 and the persistent applied AL database 356 in the kernel is to facilitate a restart of the LACM 346. Since the kernel is protected, if the AL database 348 is lost for some reason, typically the kernel will retain the persistent AL database. Another reason to keep the persistent AL database in the kernel is to facilitate software lookups for packets that require software lookups. In an embodiment, some packets, for example IP packets with options are not routable by hardware alone. For example, IP packets with options are routed to the CPU. Using software to facilitate the forwarding of these packets is well-known in the art of routers and switches and is not discussed in further detail.

In accordance with an embodiment of the invention, the LACM 346 builds and maintains the restart CAM entry database 360. The restart CAM entry database includes information (e.g., access list entry parameters and an address within the CAM where the access list entry parameters are stored) that is used to identify the location and contents of a CAM entry into the CAM 312. Basically, the restart CAM entry database is a mapping of ALs into the CAM. In an embodiment, the restart CAM entry database includes fixed size records. An advantage of maintaining fixed size records is that allocating and freeing restart CAM entry database records is performed in an O(1) ("order of one") operation. An exemplary fixed size record is illustrated in FIG. 4B.

FIG. 4B depicts an exemplary restart CAM entry database record 400A in accordance with an embodiment of the invention. The record includes an AL name field 412, an AL entry parameters field 414, an interface index field 416, a flags field 418, and a real CAM address field 420. The AL name field includes the name of the AL in which the entry is included. The AL entry parameters field includes the parameters that are included in the CAM 312 (FIG. 3). In an embodiment, the parameters include, for example, source IP address, destination IP address, TCP/UDP source port, TCP/UDP destination port, or the like. The interface index field includes the index of the interface to which the entry has been applied. The flags field includes one or more flags that indicate such things as whether the entry has been applied for input/output or access control/policy/QoS. The real CAM address field includes the CAM address of where the AL entry parameters have been stored.

Referring once again to FIG. 3, the LACM 346 updates the restart CAM entry database 360 when the AL database 348 or the applied AL database 350 change. When an AL is applied to an interface, each entry associated with the AL gets a real CAM address and a restart CAM entry database record is created for it. When a new entry is added to an AL that is already applied to an interface, the new entry gets a real CAM address and a restart CAM entry database record is created for it. In an embodiment, the restart CAM entry database 360 is stored in shared memory. A use for the restart CAM entry database is discussed later with reference to FIG. 5.

The CAM allocator 352 includes an algorithm used to determine the location of free space in the CAM 312. When an entry is to be added to the CAM 312, the CAM allocator determines the location of a free space in the CAM. Next, the ACM adds a record to the restart CAM entry database 360. Then, the LACM instructs the low level CAM driver 358 to update the CAM according the CAM allocator. In other words, the entry to be added is placed in the free space of the CAM. This is accomplished without reading the CAM itself to find free spaces. In an embodiment, the low level CAM driver is located in the kernel of the lookup module 306.

FIG. 4C depicts an exemplary lookup table 400C in accordance with an embodiment of the invention. Since in this embodiment the lookup table is implemented in a CAM, the lookup table entries are referred to as CAM entries. The lookup table includes a plurality of CAM entries 430-0 to 430-7, collectively referred to as the entries 430. The lookup table may include additional CAM entries, as well (not shown). The AL name associated with each CAM entry is listed to the left of the depicted lookup table for ease of reference (i.e., in an embodiment, the name is not included in the CAM entries themselves). Each AL is an ordered list, but the CAM entries associated with a first AL are not strictly ordered with respect to a second AL. A CAM entry may include AL entry parameters, as is the case for the CAM entries 430-0 and 430-2 to 430-6. A CAM entry may instead be empty, as is the case for the CAM entries 430-1 and 430-7. As indicated previously, the CAM entries associated with a first AL are ordered. Accordingly, assuming the CAM entries 430 are properly ordered, for the CAM entries 430-0 and 430-6, both from AL A, the CAM entry 430-0 must come before the CAM entry 430-6. The same principle applies to the CAM entries 430-2, 430-3, and 430-5. Namely, since the CAM entries are from AL B, the CAM entry 430-2 must precede the CAM entry 430-3, which must precede the CAM entry 430-5. However, since the CAM entries associated with different ALs are not strictly ordered, the CAM entry 430-6 could be moved to position 430-1 without violating the strict order requirements of AL A because the CAM entry still follows 430-0, the CAM entry from AL A that immediately preceded the CAM entry 430-6. Similarly, the CAM entry 430-4 could be moved to position 430-1 since it has a different AL from the CAM entries 430-0 to 430-3. However, the CAM entry 430-3 could not be moved to location 430-1 because it is of the same AL as the CAM entry 430-2, which presumably is supposed to precede the CAM entry 430-3.

When there is a need to restart the LACM 346 (FIG. 3), in order, for example, to upgrade software or incorporate a bug fix, the LACM preserves the existing CAM entries in the original configuration, by maintaining the information necessary to identify the original configuration in shared or persistent memory. To this end, the restart CAM entry database 360 includes information associated with each CAM entry in the CAM 312 in the original configuration. The restart CAM entry database is compared to configuration information to identify changes that may have occurred during restart. In this way, if no configuration changes are made while the LACM is offline, the configuration remains the same when the LACM comes back online. In other words, the existing CAM entries need not be read from or rewritten to the CAM. And if the configuration in the restart CAM entry database is different from the new configuration, the differences are identified. Since the differences are identified, only the differences need be addressed; so changes to the CAM are relatively minor. The changes are minor because the system maintains information necessary to identify the original configuration, eliminating the need to rewrite the CAM entries that are identical to the CAM entries of the original configuration. By comparing the restart CAM entry database with a new configuration, a restart can be accomplished that does not call for reading CAM entries from hardware, which is often slow and often takes up hardware forwarding clock cycles, thereby avoiding the dropping of packets.

Figure 5:
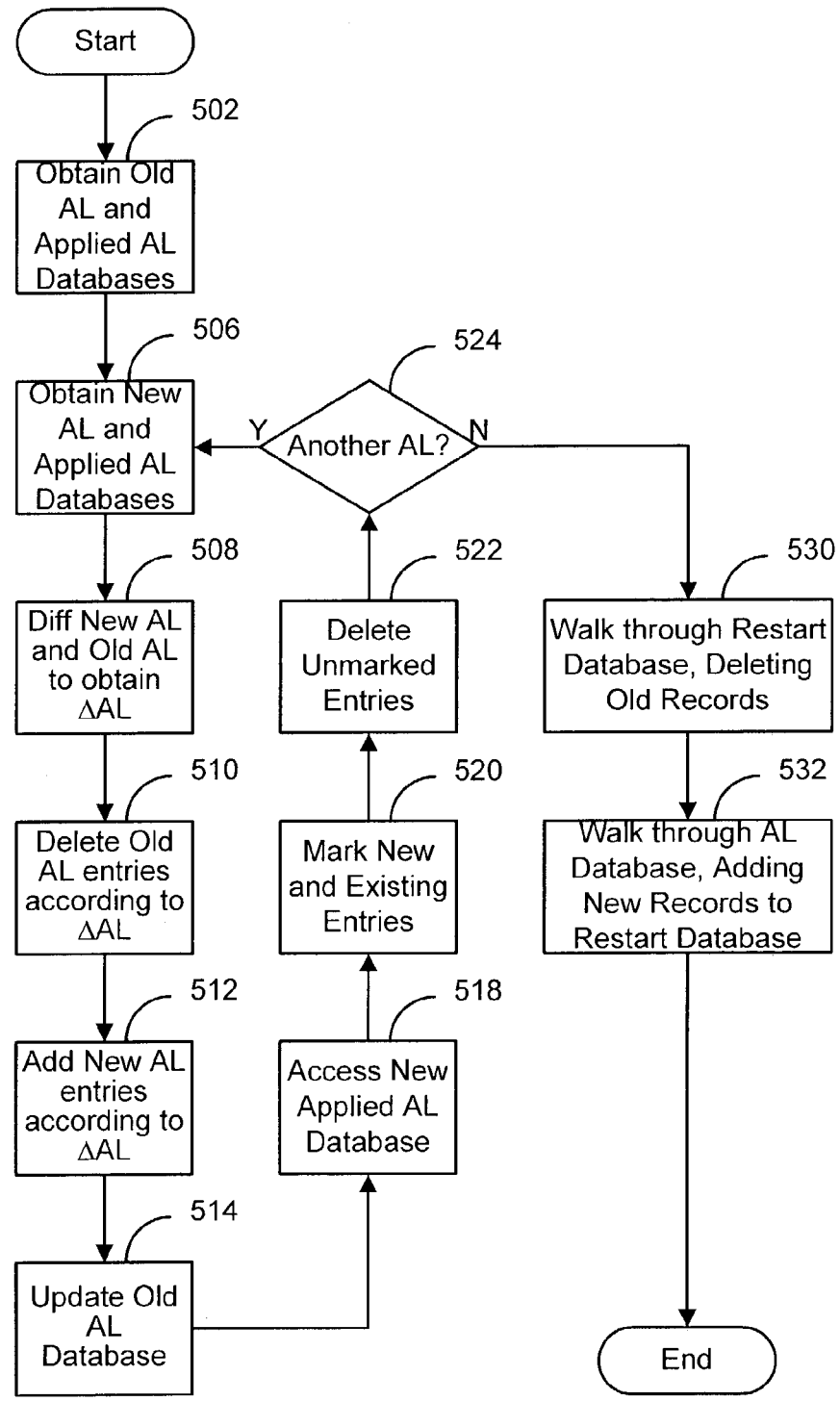
FIG. 5 is a flowchart of a method for performing hitless restart of an access control module according to an embodiment of the invention.

FIG. 5 is a flowchart 500 of a method for performing hitless restart of an access control module according to an embodiment of the invention. References to elements of FIG. 3 are for the purposes of example only. It is assumed that the flowchart 500 starts following the restart of an access control module (ACM), such as LACM 346 (FIG. 3). Since a restart implies the ACM was offline for at least a fraction of a second, any ALs maintained by the ACM may be referred to as "old".

With that in mind, the flowchart starts at step 502 with obtaining an old AL and applied AL databases from persistent memory. In an embodiment, the old AL database is the persistent AL database 354 (FIG. 3) located in the kernel of the lookup module 306 (FIG. 3). The ACM may obtain the old AL database in a batch or one AL at a time. A copy of the old AL database is stored at the ACM as a current AL database, such as the AL database 348 (FIG. 3). After that, in an embodiment, when the ACM updates the current AL database, the ACM also updates the persistent AL database. In an embodiment, the ACM also obtains an old applied AL database, such as the persistent applied AL database 356 (FIG. 3), from the kernel. A copy of the old applied AL database is stored at the ACM as a current applied AL database, such as the applied AL database 350 (FIG. 3). After that, in an embodiment, when the ACM updates the applied AL database, the ACM also updates the persistent applied AL database.

At step 506, new AL and applied AL databases are obtained from a MACM, such as the MACM 336 (FIG. 3). In an embodiment, the ACM gets one AL at a time. In an alternative, the ACM gets the ALs using GetNext. GetNext is an SNMP method that is well-known in the art of switches and routers. The new AL is new because, for example, the MACM may have updated the AL while the restarted ACM was offline. In another embodiment, the ACM gets the applied AL database in a single operation. In this embodiment, the applied AL database may be smaller than the AL database, making it less costly to obtain the entire applied AL database at once.

At step 508, the new AL and old AL are compared to obtain the differences between the ALs, referred to herein as "ΔAL." The resulting ΔAL includes each difference between the new AL and the old AL, but should not include the portions of the new AL and old AL that are unchanged. In an embodiment, the ACM DIFFs the new AL with the old AL having the same name as the new AL. A DIFF function capable of deriving ΔAL from the new AL and old AL database is described in patent application Ser. No. 10/321, 871, filed 17 Dec. 2002, entitled "MANAGING A POSITION-DEPENDENT DATA SET THAT IS STORED IN A CONTENT ADDRESSABLE MEMORY ARRAY AT A NETWORK NODE," which is incorporated in its entirety herein by reference.

At step 510, old AL entries are deleted according to the ΔAL. In an embodiment, the ACM deletes from the AL database, old AL entries that are not found in the new AL, according to the ΔAL.

At step 512, new AL entries are added according to the ΔAL. In an embodiment, the ACM adds new AL entries to the AL database according to the ΔAL.

At step 514, the old AL database is updated. In an embodiment, changes made to the AL database 348 (FIG. 3) should be made to the persistent AL database 354 (FIG. 3), since the persistent AL database is a copy of the AL database. Once all of the new ALs have been processed, the old AL database should be fully updated and current. It should be noted that once the AL database have been fully updated according to the ΔAL, the ACM may accept new AL entries for that AL, even if every AL has not yet been updated. In an embodiment, the ACM may update any AL with a name that is lexically less than or equal to the AL that has just been updated when the ACM receives subsequent AL entries.

At step 518, the new applied AL database is accessed.

At step 520, new and existing entries are marked. In an embodiment, new and existing entries are marked using flags respectively associated with entries in the applied AL database. The marking is accomplished by checking whether the AL name that was used to update the AL database at step 514 is applied as indicated in the applied AL database.

At step 522, unmarked entries are deleted. If entry is no longer valid in the new configuration, it is unmarked. Since the unmarked entries are no longer valid, they are deleted from the applied AL database.

At decision point 524, it is determined whether there is another new AL. If so (524-Y), then the flowchart continues at step 506 as described previously. If not (524-N), then the flowchart 500 continues with step 530.

At step 530, a walkthrough of the restart CAM entry database results in the deletion of old records. Each record of the restart CAM entry database should be associated with each entry in the AL database. So, if an entry is not found in the AL database when walking through the restart CAM entry database, the record is presumed to be no longer valid. Accordingly, the ACM deletes the record and an associated entry in the CAM. It should be noted that since the order of entries in the CAM is sometimes significant, occasionally a record in the restart CAM entry database will be updated only with respect to its position in the CAM (i.e., AL name and interface index remain the same, but the real CAM address changes). In this case, the old record is treated similarly to any other invalid record (e.g., it is deleted). The new record with the same AL name and interface index as the old record is treated similarly to any other valid record (e.g., it is added). If a record is found in the AL database, then that record is valid. If the valid record also was not found in the old AL database, then the ACM sets a flag associated with the new AL database entry.

At step 532, a walkthrough of the AL database results in the addition of records to the restart CAM entry database. Each record of the restart CAM entry database should be associated with each entry in the AL database. So, if an entry is new, as indicated by the flag set at step 530, a record associated with the new entry should be added to the restart CAM entry database. Accordingly, the ACM finds a free space in the CAM, adds the record to the restart CAM entry database, and adds an associated entry in the free space.

Then the flowchart 500 ends. Thus, since the old and the new AL and applied AL databases are available, the CAM need not be entirely rewritten. Moreover, since the restart CAM entry database exists, the CAM need not be read to determine its contents. Accordingly, as illustrated in FIG. 5, the ACM selectively updates the CAM with the changes to the AL database and applied AL database.

In one embodiment, the methods described above are embodied in a computer-readable media as computer instruction code. It shall be appreciated that not all methods steps described must be performed, nor must they be performed in the order stated.

For policy and QoS, multiple access list names can be applied to an interface. So during ACM restart, the same concept of DIFF on an access list level can be applied on an interface level for policy and QoS.

Although specific embodiments of the invention have been described and illustrated, the invention is not to be limited to the specific forms or arrangements of parts as described and illustrated herein. The invention is limited only by the claims.

What is claimed is:

1. A method for operating an access control module (ACM) at a packet processor module that uses a lookup table to associate forwarding information with a received packet, comprising:
   storing a lookup table in content addressable memory (CAM), the lookup table comprising lookup table entries;
   maintaining a restart CAM entry database in a shared memory that is separate from the CAM, the restart CAM entry database having records that include a CAM address of each lookup table entry in the CAM, wherein the records are fixed length;
   having the ACM go offline;
   restarting the ACM; and
   selectively updating the lookup table in the CAM according to the restart CAM entry database and a set of new lookup table entries.

2. The method of claim 1, further comprising:
   entering a first set of lookup table entries into a lookup table;
   preserving, for an ACM, the first set of lookup table entries; and
   obtaining a second set of lookup table entries,
   wherein said selectively updating further includes updating according to a subset of said second set of lookup table entries, wherein said subset includes the differences between the first set of lookup table entries and the second set of lookup table entries.

3. The method of claim 2, wherein said selectively updating further comprises:
   making changes to the lookup table for new lookup table entries, wherein the new lookup table entries are lookup table entries in the second set of lookup table entries that do not exist in the first set of lookup table entries; and
   making no changes to the lookup table for lookup table entries that exist in both the first set of lookup table entries and the second set of lookup table entries.

4. The method of claim 2, wherein said selectively updating further comprises:
   making changes to the lookup table for a first lookup table entry and a second lookup table entry that respectively exist in the first set of lookup table entries and the second set of lookup table entries, wherein the first lookup table entry and the second lookup table entry are associated with different lookup table positions, but are duplicates in other respects.

5. The method of claim 2, wherein said selectively updating further comprises:
   making changes to the lookup table for old lookup table entries, wherein the old lookup table entries are lookup table entries in the first set of lookup table entries that do not exist in the second set of lookup table entries, wherein said changes include deleting the old lookup table entries from the lookup table.

6. A traffic forwarding system configured to perform a hitless restart of an access control module (ACM), including a content addressable memory (CAM) that includes a lookup table that is used to associate routing information with a received packet, comprising:
   a restart CAM entry database stored in a memory that is separate from the CAM, the restart CAM entry database including CAM addresses of lookup table entries in the CAM; and
   a lookup module, including:
      a persistent access list (AL) database, wherein the CAM is configured to include AL entries from the persistent AL database; and
      an ACM, including:
         an AL database, including AL entries, that is a copy of the persistent AL database; and
         an access control engine configured to selectively update the CAM according to the restart CAM entry database and differences between the persistent AL database and a new AL.

7. The system of claim 6, wherein said access control engine is further configured to:
   obtain said new AL;
   derive a delta AL by comparing the new AL with an old AL in the persistent AL database, wherein the delta AL includes the differences between the new AL and the old AL; and
   selectively update the restart CAM entry database according to the delta AL.

8. The system of claim 7, further comprising a main access control module (MACM) that includes a main AL database, wherein the AL database is configured to contain AL entries of the main AL database.

9. The system of claim 6, wherein said ACM further comprises an applied AL database and said lookup module further comprises a persistent applied AL database that is a copy of the applied AL database.

10. The system of claim 9, wherein said access control engine is further configured to:
   set the applied AL database to the persistent applied AL database when the ACM is restarted, wherein the applied AL database is used to ensure that an access list is properly mapped to an interface.

11. The system of claim 6, wherein said access control engine is further configured to:
   set the AL database to the persistent AL database when the ACM is restarted.

12. The system of claim 6, further comprising a CAM allocator configured to determine the location of free space in the CAM.

13. The system of claim 6, wherein said lookup module further includes a CAM driver that the ACM instructs to selectively update the CAM.

* * * * *